Figure 1:
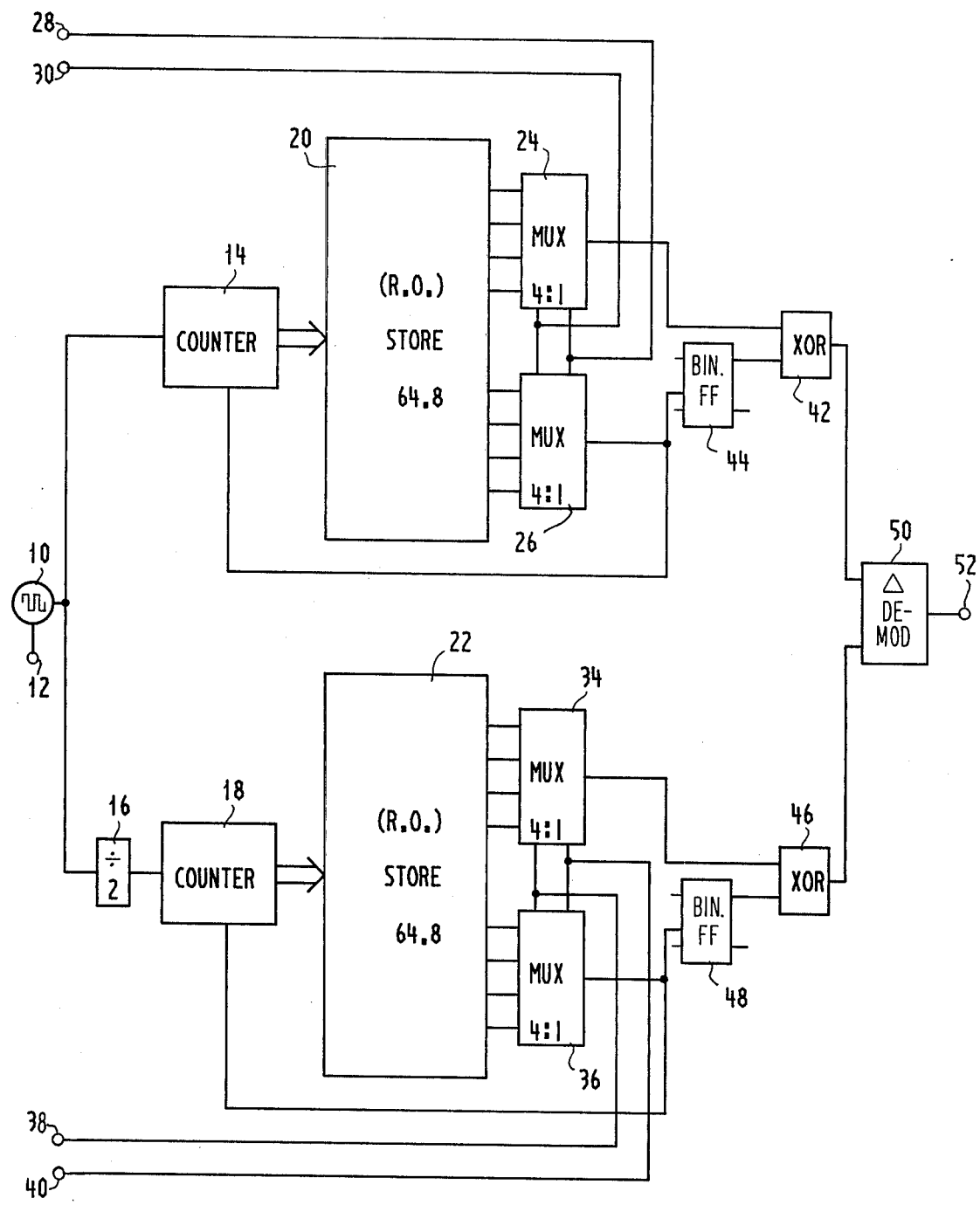

United States Patent [19]
Newsom et al.

[11] 3,959,604
[45] May 25, 1976

[54] DIGITAL CALLING SIGNAL TONE GENERATING CIRCUITRY

[75] Inventors: Harley Monroe Newsom, Los Gatos; Michael Allen Patten, San Jose, both of Calif.

[73] Assignee: International Business Machines Corporation, Armonk, N.Y.

[22] Filed: Apr. 7, 1975

[21] Appl. No.: 565,487

[52] U.S. Cl. ............................................ 179/84 VF
[51] Int. Cl.² ........................................ H04M 1/50
[58] Field of Search ......... 179/84 VF, 90 K, 15 BY; 340/347 DA; 84/1.01

[56] References Cited
UNITED STATES PATENTS

| | | | |
|---|---|---|---|
| 3,128,349 | 4/1964 | Boesch | 179/84 VF |
| 3,288,940 | 11/1966 | Bennett | 179/84 VF |
| 3,381,276 | 4/1968 | James | 340/172.5 |
| 3,456,085 | 7/1969 | Huizinga | 179/90 B |
| 3,515,792 | 6/1970 | Deutsch | 84/1.03 |
| 3,772,681 | 11/1973 | Skingle | 340/347 DA |
| 3,816,635 | 6/1974 | Uetrecht | 84/1.01 |
| 3,826,995 | 7/1974 | Miller | 331/38 |
| 3,882,751 | 5/1975 | Tomisawa | 84/1.01 |
| R25,507 | 1/1964 | Meacham | 179/81 R |

FOREIGN PATENTS OR APPLICATIONS

| | | |
|---|---|---|
| 7,001,601 | 11/1971 | France |
| 1,214,740 | 4/1966 | Germany |

OTHER PUBLICATIONS
R. L. Adams and F. A. Reiley, "Parallel Tone Generator Using Variable-Period Counters," IBM Tech. Disc. Vol. 15, No. 11, Apr. 1973, pp. 3457-3458.

*Primary Examiner*—Kathleen H. Claffy
*Assistant Examiner*—Joseph A. Popek
*Attorney, Agent, or Firm*—George E. Roush

[57] ABSTRACT

Calling signals for tone-frequency telephone calling and like communications systems are generated in digital form. For the eight tone frequencies used in American telephone systems, a group of about 50 bits (average) for each tone is stored in an electronic store in delta modulation data form. Circuitry according to the invention is arranged for repetitively reproducing the contents of the store to produce a substantially continuous waveform. Bits for one high frequency band tone and one low frequency band tone are selectively reproduced and applied to a delta demodulation circuit for producing the desired tone-frequency analog signal. In a basic embodiment, start-stop operation is used for producing a calling signal for a single switching operation. A continuously operating tone frequency generating circuit embodiment is arranged for producing a multiple of continuously available tone signalling outputs. Both embodiments are readily constructed as Large Scale Integration (LSI) devices and readily arranged with the remainder of the communications lines switching circuit components in a central or branch exchange installation.

14 Claims, 2 Drawing Figures

DIGITAL CALLING SIGNAL TONE GENERATING CIRCUITRY

The instant application stems from the same endeavors that produced the co-pending U.S. Pat. Application Ser. No. 475,682 of Dale Edward Fisk et al. filed on June 3, 1974 for "Electric Signal Exchange Switching Circuit Arrangement" and thereafter issued on July 1, 1975 as U.S. Pat. No. 3,892,925.

The invention relates to circuitry for producing calling signal tones for communications systems having electric circuit switching components to which electric signals are translated for distribution among a multiple of terminals, and it particularly pertains to digital techniques for producing tone frequency calling signals for such switching systems.

There are numerous circuit arrangements in the prior art for producing tone frequency signals for calling subscribers. Those prior art arrangements coming closest to the circuitry of the invention of which the inventors are aware are to be found in the following U.S. Pat. Nos.:

| | | | |
|---|---|---|---|
| 3,064,084 | 1/1964 | Meacham | 179/81 |
| 3,128,349 | 4/1964 | Boesch et al | 179/84 |
| 3,288,940 | 11/1966 | Bennett et al | 179/84 |
| 3,381,276 | 4/1968 | James | 340/172.5 |
| 3,456,085 | 7/1969 | Huizinga et al | 179/90 |
| 3,515,792 | 6/1970 | Deutsch | 84/1.03 |
| 3,772,681 | 11/1973 | Skingle | 340/347 DA |
| 3,816,635 | 6/1974 | Uetrecht | 84/1.01 |
| 3,826,995 | 7/1974 | Miller | 331/38 |

In Foreign Pat. Nos.

| | | | |
|---|---|---|---|
| 70 01 601 | 11/1971 | FRANCE | H 04q 1/00 |
| 1,214,740 | 4/1966 | GERMANY (F.R.G.) | H04m |

And in the technical literature:

R. L. Adams and F. A. Reiley, "Parallel Tone Generator Using Variable-Period Counters", IBM Technical Disclosure Bulletin Vol. 15, No. 11, April 1973, pp. 3457-8.

The prior art patent to Meacham shows a calling signal generator of an early type but which does produce two tones from high and low frequency bands. The patents to Boesch et al and to Bennett et al disclose tone frequency generation only as required for describing the Multi-Frequency Receiver (MFR) respectively shown and claimed.

The U.S. patents to Deutsch, Uetrecht and Miller and the German patent are directed to circuitry for generating a large number of frequencies with a smaller number of generators. Harmonically related frequencies are desired in musical instrument applications, but not in telephone and like applications.

The patent to Skingle is directed to a tone frequency synthesizer having a digital store in which the amplitude values for a set of equally spaced time increments of a single quarter cycle are stored and reproduced on call for conversion to an analog wave form in a Digital-to-Analog (D-A) converter. No provisions are made for dual tone telephone calling signal generation.

The patents to James and to Huizinga et al disclose arrangements that are only superficially similar to that of the invention. The James disclosure is anomalistic in that it is directed to an arrangement in which a unitary component frequency tone is derived from a tone composed of a plurality of component tones. The Huizings et al disclosure is actually directed to conventional Bell System tone frequency generation arranged in combination with calling signal selecting and recording circuitry.

The article of Adams and Reiley is directed to an application similar to that for which the invention is intended. However, the tone frequencies are obtained directly by dividing the output of a relatively high frequency oscillator by variable-period counters.

The French patent is directed to tone frequency generating circuitry delivering tones harmonically related to a common frequency $1/\tau$. Samples of the signals taken at regular time intervals over a $\tau/4$ period are stored and converted into a sign binary digit and a plurality of code binary digits. The store is operated as follows: during a first $\tau/4$ period, the samples are read forwards, during a second $\tau_\tau/4$ period said samples are read backwards, during a third period, the samples are read forwards and the sign digit is inverted, during a fourth $\tau/4$ period the samples are read backwards and the sign digit is inverted.

These patents disclose methods and show circuits for generating sinuosidal and other waveforms by digital techniques. Some of the basic principles disclosed in these references are utilized in the circuitry according to the invention, but which teaches the attainment of simpler, less expensive, and more stable generators. The technique of the invention is applicable wherever a fixed frequency tone or group of fixed frequency tones need be generated such as in Frequency Shift Keying (FSK) or Phase Shift Keying (PSK) modems as well as in tone calling signal generators.

An analog waveform of predetermined configuration (specifically an approximate sine wave in this application) is synthesized by inputting an appropriate serial strream of binary ones and zeroes to a delta demodulator. The bit pattern to synthesize one cycle of the waveform is stored in a Reproduce Only Store (ROS) and a continuous waveform is generated by repetitively reading the contents of the ROS.

The objects of the invention indirectly referred to hereinbefore and those that will appear as the specification progresses, obtain according to the invention by circuitry for storing a number of binary digits of a set of points regularly spaced on a waveform for each frequency of tone desired and reading these digits out seriatum for the tone desired. The tone frequency brought out of storage is preferably an approximate sine wave whereby a half or a quarter wave is stored for each frequency tone to be reproduced. Eight different frequencies of sinusiodal waveforms are required for conventional American telephone system tone calling signals. They are grouped into two bands, a high frequency and a low frequency band. Calling signals comprise two tones generated simultaneously, one from the low band and one from the high. An average of about fifty bits for each half-cycle of waveform is sufficient where the sine wave is delta modulated because the pattern for each successive cycle is the same as the previous half cycle except the bit pattern is inverted. Storage can be reduced further by using a quarter cycle where the bit order is transposed and inverted as required, but this increases the complexity of the reproducing circuitry.

For a system whereby two tone frequencies are combined to form a touch-tone telephone calling signal on demand, a square wave generator is enabled upon demand to advance one electronic digital counter at a given rate and to advance another electronic digital counter at half the rate. The counters serve as address generators for causng the bits in each store to be presented at the output of selecting circuitry. One selecting circuit delivers a high frequency tone and the other delivers a low frequency tone in accordance with the predetermined frequencies of American touch-tone calling signal frequency practice. One high and one low frequency tone are applied through exclusive OR gating circuit to the input terminals of a delta demodulator circuit which delivers a composite analog tone signal at the output terminal thereof. Reset signals are also generated at the selecting circuits for resetting the counter circuits and triggering binary flip-flop circuits for inverting the half-cycle data alternately for providing full cycle output waves.

In another embodiment of the invention, four counters and appropriate gating circuitry are used to provide a source of continuously generated high and low frequency tone signals which may be switched in the signal central or branch office exchange in the same manner as for the old fashioned electromechanical ringing or calling signal generators. Electronic bilateral flip-flop circuits are provided on the output of the ROS since the desired data for a given tone is only present during the respective storage cycle. Separate binary flip-flop circuits are provided to control the inverting action of the expanded system since the data points of the different tones are obtained at different times.

Figure 2:
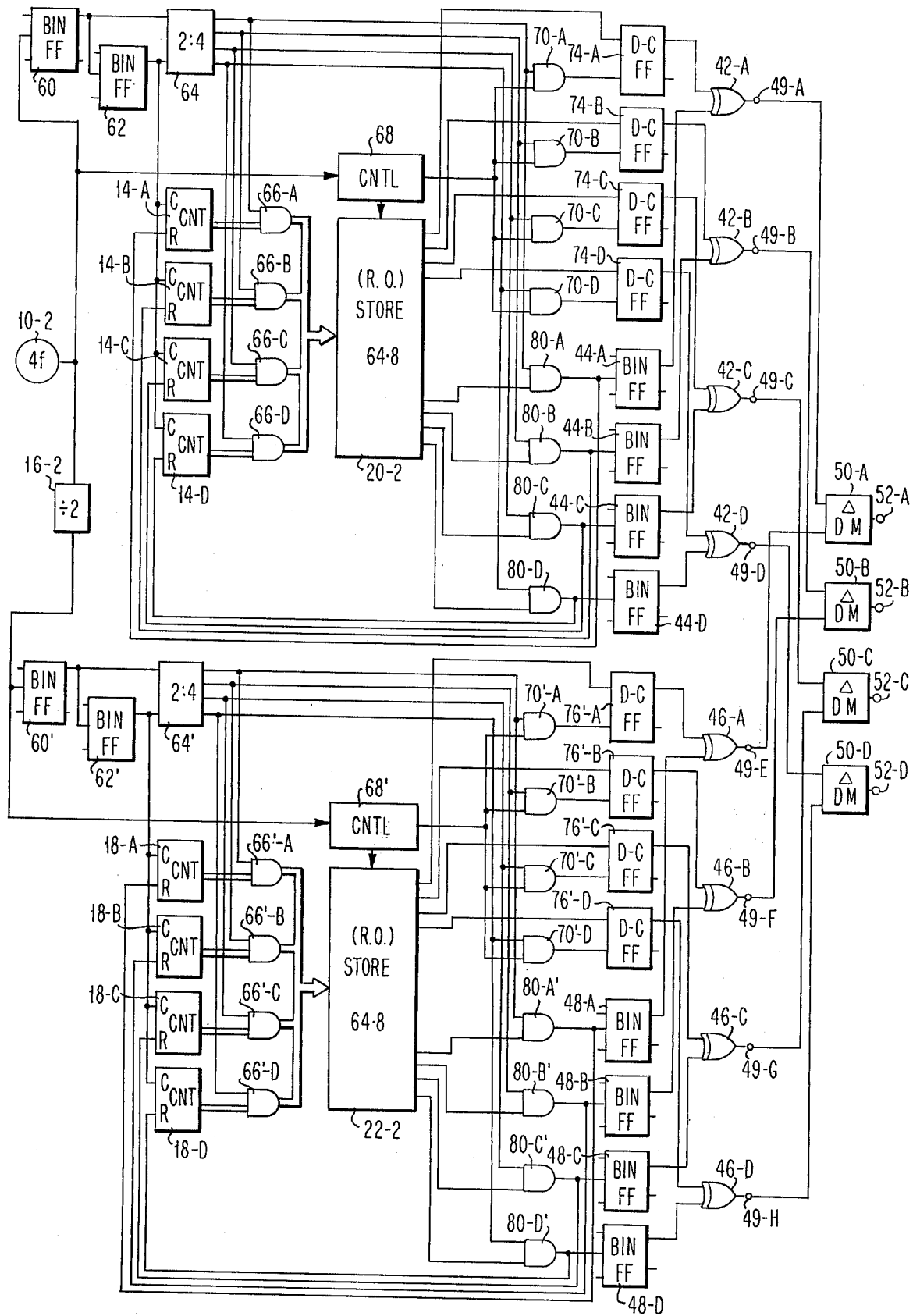

In order that the full advantage be obtained in the practice of the invention, preferred embodiments thereof, given by way of example only, are described in detail hereinafter with reference to the accompanying drawing, forming a part of the specification, and in which:

FIG. 1 is a logical circuit diagram of the basic embodiment of a digital caling signal tone generating circuit according to the invention; and FIG. 2 is a similar diagram of a continuously operating embodiment of a digital calling signal tone generating circuit according to the invention.

The logical circuit diagram of FIG. 1 shows a basic configuration for generating "touch-tone" (a trademark of the Bell System) and like telephone "dialing" or calling signals "on demand". A square wave generator 10 is enabled by a logical electric level potential applied at a terminal 12. The output of the generator 10 is applied to one electronic digital counter 14 and to a dividing circuit 16 connected to another electronic digital counter 18. The counters serve as address generators and are individually connected to Reproduce Only (RO) Stores 20 and 22. Two N:1 (4:1 as shown) selecting circuits 24 and 26 are wired into the high frequency store 20. All of the logical circuit devices in the diagrams are conventional items readily available and need no detailed explanation except that the Reproduce Only Stores (ROS) and the selecting circuits must be compatible logically as well as electrically. The ROS as shown are of a type which is addressable by a counter and the contents of the store are delivered on two sets of four parts. The digital increments of each waveform in terms of binary units or naughts are delivered in sequence on one of four lines connected to the selecting circuit 24 (and 34) while reset bits corresponding to terminal digits but of consistent sign are delivered on four lines connected to the selecting circuit 26 (and 36). This arrangement is used because it lends itself to the simple inversion of half wave data with binary 4:1 selecting circuits as shown. The term demultiplexer is more often used commercially to identify many of these circuit selecting devices as commercially available, which frequently are composed of AND gating circuits, inverting circuits and an OR gating circuit connected as 4-pole binary line selecting circuits.

Logical electric levels are applied in binary fashion at terminals 28,30 for selecting the high frequency tones. Data signal is translated from the selecting one of circuit 24 to an exclusive OR (XOR) gating circuit 42. Reset signals pass from the selecting circuit 26 to a binary flip-flop circuit 44 to the XOR gating circuit 42 and also to the counter 14 for resetting it at the end of a (half) cycle. Similarly, the other store 22 is wired to two selecting circuits 34 and 36. One of the low frequency calling tones are selected by applying appropriate logical electric levels at terminals 38,40 and the selecting circuits 34,36 are connected to an XOR gating circuit 46 and a binary flip-flop circuit 48. The binary flip-flop circuit 44 (and 48) is triggered on every reset bit. On one half-cycle of the waveform, the XOR gating circuit 42 (or 46) presents the data in erect aspect and on the other half-cycle, the data is inverted as it is applied to the demodulator 50. Thus, a full cycle of a sine wave is presented to the demodulator 50. The outputs of the XOR gating circuits 42 and 46 are applied to a delta demodulating circuit 50. This demodulator delivers a composite analog tone signal at an output terminal 52 after the selecting is made and the demand made by raising the level and the enabling terminal 12.

In this arrangement, the bit rate into the delta demodulator for the high and frequencies is 154154Hz and for the low band is half that rate or 77077Hz whereby the number of bits stored to generate one half cycle of each of the tones is as given below:

|  | Freq Hz | Needed No. Bits | Resultant Fund. Freq Hz | (Clock/ No. Bits) | % % |
|---|---|---|---|---|---|
| Lo Band | 697 | 55 | 700.7 |  | +0.53 |
|  | 770 | 50 | 770.8 |  | +0.1 |
|  | 852 | 45 | 856.4 |  | +0.52 |
|  | 941 | 41 | 940.0 |  | −0.11 |
| Hi Band | 1209 | 64 | 1204.3 |  | −0.39 |
|  | 1336 | 58 | 1328.9 |  | −0.53 |
|  | 1477 | 52 | 1482.3 |  | +0.36 |
|  | 1633 | 47 | 1639.4 |  | +0.42 |

To reduce the possibility of errors on decoding, these frequencies were selected by telephone system designers to have no common factor greater than 1. This means that the waveform of any two tone combination repeats itself only once a second and if each of the 16 possible combinations of two tones were to be stored in delta modulated form, a store large enough to hold ½ second of data would be required. This would require 1,071,248 bits of storage.

With the tone bit patterns stored individually, according to the invention, only one-half cycle of pattern is required for each tone, for a theoretical total storage requirement of 412 bits as indicated in the table for all eight tones. Such a minimum storage arrangement would require more complex control. For a practical application, such as the arrangement shown in the drawing, 64 bits of storage for each frequency will be sufficient for the frequencies listed. Thus, each store requires 64 · 4 bits or 256 bits for the four frequencies in each store or 512 bits in both stores. The reset bit store, preferably is the same size in order to save control circuitry also whereby 512 bits are required for each band or 1024 bits for the entire set of tones and reset signals.

The number of bits to be reproduced from the ROS varies with the frequency. The logical diagram shown is based on a method of control having an extra bit, called a "reset" bit, stored in the ROS for each frequency tone and addressable at the same time as the terminal data bit for that tone.

Upon a demand to generate a pair of tones, one high frequency tone and one low frequency tone are selected by applying the corresponding binary signals to the 4:1 multiplexers 24,26,34,36 and the oscillator 10 is enabled. Binary addresses to the ROS are generated and updated at the clock rate by the Binary Counter Address Generator, and the contents of the ROS for frequency selected, appear on the Data and Reset output lines of the multiplexors. After the proper number of bits are read from the ROS, a reset bit stored in the ROS will cause the address generation counter 14 to be reset, and the cycle will repeat as long as the clock oscillator 10 is enabled. Each time the reset bit is delivered, the binary flip-flop circuits 44,45 will toggle causing the XOR circuits 42,46 to invert the data to the delta demodulator 50. The delta modulator 50 mixes the high and low frequency bit streams and delivers a composite analog calling signal output.

If desired, the integration step value of the demodulator 50 is made a function of the frequency selected, enabling amplitude control (weighting) of the tones.

In this example, the low group clock is exactly half the frequency of the high group clock. This is convenient but not necessary. While it is better that they be made non-coherent to reduce the possibility of harmonic interference, it should be noted that even where the low bands are harmonically related, the tone signals need not be—and are not in the example given.

Control of the number of bits read from the ROS is also accomplished by decoding a reset from the address generating counter 14(18) dependent upon the frequency selected. Alternatively, a string of consecutive binary units occurring in the vicinity of a zero crossing of a delta modulated sine wave are sensed and applied to reset the counter 14(18).

A continuously operating generator of eight fundamental tones is diagrammed in FIG. 2. A reference or clocking square wave generator 10-2 has a repetition rate four tmes that of the basic clocking rate for operating two four-phase subsystems. A divide-by-2 divider 16-2 is used in the same manner as for the start-stop embodiment. Alternatively, another clocking wave generator of substantially, but not exactly half frequency is used where it is desired to avoid harmonically related sets of tones. The ROS 20-2 and 22-2 are conventional storage devices readily available commercially. These ROS are arranged for delivering continuous streams of data on four lines with corresponding reset digits (again corresponding to terminal digits but of a predetermined and consistent sign) occurring on four other lines as the half-cycle waveform is delivered in response to the advancement of counters 14-A . . . 14-D and 18-A . . . 18-D much as for the demand embodiment. Inversion of the stored waveforms on alternate half cycles is effected by XOR gating circuits 42-A . . . 42-D and 46-A . . . 46-D in conjunction with the corresponding binary flip-flop circuits 44-A . . . 48-D. Eight different tone frequencies are delivered at terminals 49-A . . . 49-D. Sixteen delta demodulators can be connected in all possible permutations for realizing 16 different two-tone combinations. In conventional American practice only 10 such combinations are used for calling signals and two other combinations are used for control signals from subscriber sets. The remaining four two-tone combinations are available for use in the central and branch exchanges as desired. Only four delta demodulators 50-A . . . 50-D conventionally are shown for example.

The circuit components described above which correspond in functions to those in the demand embodiment are made to cycle continuously by two four-phase subsystems connected to the clocking pulse train generator 10-2. There is one such subsystem for the higher frequency band and a substantially identical one for the lower frequency band, in view of which only one will be described in detail.

The output of the clock pulse generator 10-2 is applied to a pair of cascaded binary flip-flop circuits 60,62. The latter are connected to a conventional 2:4 decoding circuit 64 from which four-phase pulse waves are available. The binary flip-flop circuits 60 and 62 effectively divide by a factor of 4 to supply clock rate pulses to advance the counting circuits 14-A . . . 14-D. The outputs of the counting circuits are gated sequentially in AND gating circuits 66-A . . . 66-D, by means of the timing pulse waves from the four-phase circuit 64, to the ROS 20-2. The latter is cycled under the control of a circuit 68 which also develops a "valid signal" pulse train at clock rate for enabling four AND gating circuits 70-A . . . 70-D. The four timing pulse waves are applied to the gating circuits 70-A . . . 70-D for sequentially resetting bilateral flip-flop circuits 74-A . . . 74-D respectively in readiness to be set by output pulses from the ROS 20-2 as the latter pulses arrive. As shown, Data-Clocked (D-C) flip-flop circuits are preferred. Data bits from the ROS 20-2 are thereby sequentially delivered to the XOR gating circuits 42-A . . . 42-D and appear at the output terminals 49-A . . . 49-D. Similarly, AND gating circuits 80-A . . . 80-D are enabled by the timing pulse waves from the decoding circuit 64 to pass the reset bits to the counters 14-A . . . 14-D respectively for effecting repetition of the addressing cycle and to the binary flip-flop circuits 44-A . . . 44-D for alternating the inversion of the data for each half-cycle of each tone.

The lower frequency band circuitry is connected and operates in the same fashion. The delta demodulators 50-A, 50-B, 50-C and so forth are connected to share bit streams emanating from the output terminals 49-A . . . 49-H for producing a multiple of independently controlled tone calling signal outputs.

While an address counter is required for each tone and gating and flip-flop circuits are required because the wavepoints of the different tones are reached at differing times, the overall circuit arrangement is readily laid down on one semiconductor substrate at low cost.

While the invention has been shown and described with reference to a specific embodiment thereof, it should be understood that those skilled in the art will make changes without departing from the spirit and the scope of the invention as defined in the appended claims.

The invention claimed is:

1. Digital calling signal tone generating circuitry comprising electronic binary digital storing circuitry wherein binary data representing incremental changes in amplitude at substantially uniformly spaced points along a portion of a predetermined waveform are stored for a plurality of waves differing in frequency having addressing circuitry and data output circuitry from which binary data issues including control digits corresponding in time to the terminal digit of each stored waveform, electronic counting circuitry coupled to said addressing circuitry of said storing circuitry for incrementally addressing the same and issuing said binary data from said output circuitry in a continuous train, a source of clocking impulses of repetition rate greater than the highest frequency of said waves and coupled to said counting circuitry for advancing the same, an electric circuit connection for conveying said control digits to said counting circuitry for resetting the same and thereby maintaining said continuous issue of data, XOR gating circuitry having an input lead coupled to said data output circuitry, another input lead and having an output lead, binary flip-flop circuitry having an input lead coupled to said output circuitry for accepting said control digit and an output lead coupled to said other input lead of said XOR gating circuitry, and delta demodulating circuitry connected to the output lead of said XOR gating circuitry and having output terminals at which analog calling signal tones are delivered.

2. Digital calling signal tone generating circuitry, comprising two electronic binary digital stores wherein binary data representing incremental changes in amplitude at substantially uniformly spaced points along a portion of a predetermined waveform are stored for a plurality of waves differing in frequency and having addressing circuitry addressable by digital steps, and data output circuitry delivering data including terminal digit data for each of said predetermined waveforms on a corresponding one of a multiple of lines, at least two electronic counting circuits individually connected to said addressing circuitry of said electronic stores for incrementally addressing the same, and having count and reset terminals, a clocking pulse train generator of repetition rate greater than the highest frequency of said waves connected to the count terminals of one of said counting circuits, a frequency divider interconnecting said clocking train generator to the count terminals of the other of said counting circuits, selecting circuitry connected to said data output and said terminal digit data circuitry of each of said stores and having at least one data output line and one terminal digit output line, electric circuit connections between said terminal digit output lines and said reset terminals, at least two XOR gating circuits each having one input lead connected to said data output line of said selecting circuitry, another input lead and an output lead, and at least two binary flip-flop circuits each having an input terminal connected to said terminal digit output line of said selecting circuitry and having an output lead connected to the other input lead of one of said XOR gating circuits, whereby alternate half-cycles of each stored waveform are inverted on said output leads of said XOR gating circuits for providing full cycle waveforms thereat.

3. Digital calling signal tone generating circuitry as defined in claim 2 and incorporating a delta demodulator circuit having input leads connected to the output leads of said XOR circuitry and an output lead at which a dual tone calling signal is delivered.

4. Digital calling signal tone generating circuitry as defined in claim 2 and wherein said selecting circuitry comprises two four-wire-to-one-wire wire selecting circuits individually connected to each of said stores and having binary selection leads connected in common to said selecting circuits for each of said stores.

5. Digital calling signal tone generating circuitry, comprising two electronic binary digital stores wherein binary data representing incremental changes in amplitude at substantially uniformly spaced points along a portion of a predetermined waveform are stored for a plurality of waves differing in frequency and having addressing circuitry addressable by digital steps, and data output circuitry delivering digital wave data for each of said predetermined waveforms on a corresponding one of a multiple of lines and delivering terminal digit data corresponding to said digital wave data on one of another set of multiple lines, two electronic counting circuits individually connected to said addressing circuitry of said electronic stores for incrementally addressing the same, and having count and reset terminals, a clocking pulse train generator of pulse frequency greater than the highest frequency of said waves connected to the count terminals of one of said counting circuits, a frequency divider interconnecting said clocking train generator to the count terminals of the other of said counting circuits, a selecting circuit connected to each set of multiple lines of said stores and having a one data output line and at least two selecting digit input lines connected to input terminals at which binary signals are applied for selecting the waveform, electric circuit connections between said lines delivering terminal digit data and said reset terminals, an XOR gating circuit having one input lead connected to said digital wave data output line of each of the two data wave selecting circuits, another input lead and an output lead, and a binary flip-flop circuit having an input terminal connected to said output line of each of the terminal digit selecting circuits and having an output lead connected to the other input lead of the corresponding XOR gating circuit, whereby alternate half-cycles of each stored waveform selected are inverted on said output lead of said XOR gating circuit for providing a full cycle waveform data thereat.

6. Digital calling signal tone generating circuitry as defined in claim 5 and incorporating
a delta demodulating circuit having two input leads individually connected to said OR gating circuits and an output lead at which a dual tone frequency analog wave is presented 7. Digital calling signal tone generating circuitry as defined in claim 6 and wherein
said clocking pulse train generating is a start-stop circuit and is enabled after said selecting circuits have had binary selecting levels applied.

8. Digital calling signal tone generating circuitry as defined in claim 7 and wherein
said frequency divider is arranged for 2:1 division.

9. Digital calling signal tone generating circuitry, comprising
two electronic binary digital stores wherein binary data representing incremental changes in amplitude at substantially uniformly spaced points along a portion of a predetermined waveform are stored for a plurality of waves differing in frequency and having addressing circuitry addressable by digital steps, and data output circuitry delivering digital wave data for each of said predetermined waveforms on a corresponding one of a multiple of lines and delivering terminal digit data corresponding to said digital wave data on one of another set of multiple lines,
two sets of four electronic counting circuits individually connected to said addressing circuitry of said electronic stores for incrementally addressing the same, and having count and reset terminals,
a clocking pulse train generating circuit of pulse frequency greater than the highest frequency of said waves connected to the count terminals of one set of said counting circuits
a frequency divider interconnecting said clocking train generator to the count terminals of the other set of said counting circuits,
first AND gating circuits having input leads individual to the output leads of said counting circuits, other input leads, and output leads connected to the addressing circuitry of said stores;
second AND gating circuits having input leads individually connected to one of said multiples of terminal digit data lines, other input leads, and output leads connected to the reset terminals of corresponding counting circuits,
third AND gating circuits having input leads connected in common, other input leads and output leads,
distributing circuitry connected to said common input leads of said further AND gating circuits and to said other input leads of each of said first and said second AND gating circuits for time sharing said output lines of said stores,
a bilateral flip-flop circuit having a set terminal connected to each one of the digital wave data terminals of said stores, having a reset terminal connected to said output lead of said third AND gating circuits, and having an output terminal,
an XOR gating circuit having one input lead connected to said output terminal of each of bilateral flip-flop circuits, another input lead and an output lead, and
a binary flip-flop circuit having an input terminal connected to said output terminal of each of said second AND gating circuits and having an output lead connected to the other input lead of the corresponding one of said XOR gating circuits,
whereby alternate half-cycles of each stored waveform selected are inverted on said output leads of said XOR gating circuits for providing full cycle waveform data thereat.

10. Digital calling signal tone generating circuitry as described in claim 9 and wherein
said clocking pulse train generating circuit comprises an oscillator of frequency N times the basic clock rate and said distributing circuitry effectively divides the output of said oscillator by N for producing N phase operation of said stores and associated circuitry.

11. Digital calling signal tone generating circuitry as described in claim 10 and wherein
said distributing circuitry includes a store cycling control circuit connected to said oscillator in one instance and to said frequency divider in the other instance, connected to the corresponding store for cycling the same, and connected to said common connection of said further AND gating circuits for enabling the same.

12. Digital calling signal tone generating circuitry as described in claim 11 and wherein
said distributing circuitry comprises N/2 cascaded binary flip-flop circuits having output terminals, where N is any even integer, and
a N/2:N phase converter circuit having input terminals connected to said output terminals of said cascaded flip-flop circuits, and having output terminals permutated among said input leads of said AND gating circuits.

13. Digital calling signal tone generating circuitry comprising
electronic binary storing circuitry wherein binary data representing incremental changes in amplitude at substantially uniformly spaced points along a portion of a predetermined waveform are stored for a plurality of waves differing in frequency having addressing circuitry and data output circuitry from which binary data issues including control digits corresponding in time to the terminal digit of each stored waveform,
electronic counting circuitry coupled to said storing circuitry for incrementally addressing the same and issuing said binary data from said output circuitry in a continuous train,
a source of clocking impulses of repetition rate greater than the highest frequency of said waves and coupled to said counting circuitry for advancing the same,
an electric circuit connection for conveying said control digits to said counting circuitry for resetting the same and thereby maintaining said continuous issue of data,
half-cycle waveform translating and inverting circuitry connected to said storing circuitry and having an input lead coupled to said data output circuitry for accepting binary data corresponding to the stored waveform, another input lead coupled to said output circuitry for accepting said control digit, and an output lead, and
delta demodulating circuitry connected to said translating and inverting circuitry output lead and having output terminals at which analog calling signal tones are delivered, whereby alternate half-cycles of each stored waveform are inverted on said output lead for providing full cycle waveforms thereat.

14. Digital calling signal tone generating circuitry comprising two electronic binary digital stores wherein binary data representing incremental changes in amplitude at substantially uniformly spaced points along a portion of a predetermined waveform are stored for a plurality of waves differing in frequency and having addressing circuitry addressable by digital steps, and data output circuitry delivering data including terminal digit data for each of said predetermined waveforms on a corresponding one of a multiple of lines, at least two electronic counting circuits individually connected to said addressing circuitry of said electronic stores for incrementally addressing the same and having count and reset terminals, a clocking pulse train generator of repetition rate greater than the highest frequency of said waves connected to the count terminals of one of said counting circuits, a frequency divider interconnecting said clocking train generator to the count terminals of the other of said counting circuits, selecting circuitry connected to each of said stores for accepting waveform and corresponding terminal digit data therefrom and having at least one data output line and one terminal digit output line, and half-cycle waveform and translating circuit having one input lead connected to said data line of said selecting circuitry, another input lead connected to said terminal digit output line of said selecting circuitry, and having an output lead, whereby alternate half-cycles of each stored waveform are inverted on said output lead for providing full cycle waveforms thereat.

* * * * *